United States Patent

[11] 3,619,771

| [72] | Inventor | Rudolf G. Hentschel |
| | | 2002 Wayne, Ann Arbor, Mich. 48104 |
| [21] | Appl. No. | 854,613 |
| [22] | Filed | Sept. 2, 1969 |
| [45] | Patented | Nov. 9, 1971 |

[54] METHOD OF AN APPARATUS FOR SELECTING THE OPTIMUM TEST FREQUENCY IN EDDY CURRENT TESTING
11 Claims, 8 Drawing Figs.

| [52] | U.S. Cl. | 324/40 |
| [51] | Int. Cl. | G01r 33/14 |
| [50] | Field of Search | 324/40, 34 |

[56] References Cited
UNITED STATES PATENTS
| 3,337,796 | 8/1967 | Hentschel et al. | 324/40 |
| 3,464,002 | 8/1969 | Hentschel | 324/40 |

*Primary Examiner*—Alfred E. Smith
*Attorney*—Olsen and Stephenson

ABSTRACT: A method and apparatus for measuring the metallurgical characteristics of a material by sensing the eddy current characteristics of the material through an extremely wide range of frequencies, selecting that frequency at which the resistive component of the eddy current device output signal is greatest, and then testing various similar shapes of material for variation in metallurgical characteristics.

MAG. FIELD AND CURRENT

OUTPUT OF INTEGRATOR

INVENTOR
RUDOLF G. HENTSCHEL

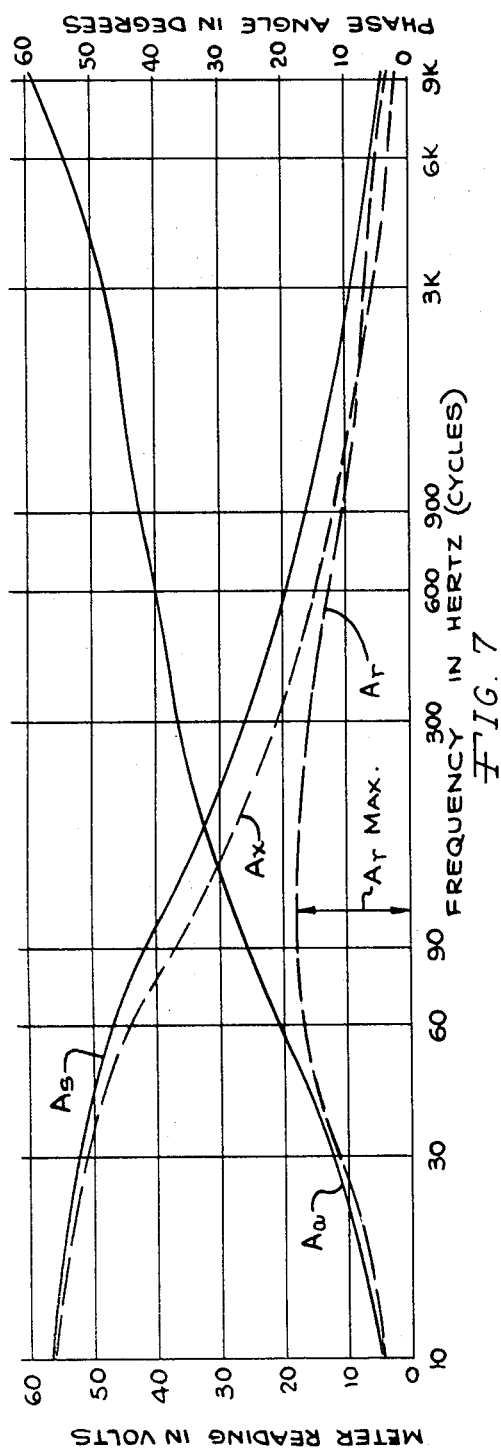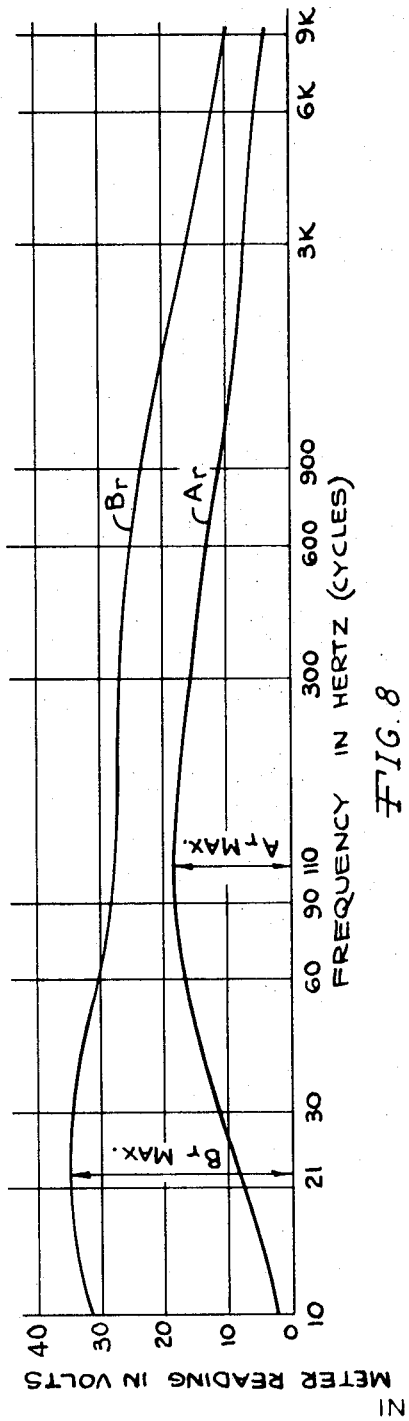

3,619,771

METHOD OF AN APPARATUS FOR SELECTING THE OPTIMUM TEST FREQUENCY IN EDDY CURRENT TESTING

BACKGROUND OF THE INVENTION INVENTION

It is comparatively simple to qualitatively determine the magnetic characteristics and certain metallurgical characteristics of material by determining the coupling effects which exist when the material is placed in the alternating magnetic field of a primary coil, the output of which is sensed by the secondary coil of an eddy current device.

If the eddy current device and frequencies used are standardized the qualitative results become more quantitative. The more the standardization of size and shape of the parts and the more the coupling device and the magnitude and frequency of the signal are standardized the more nearly quantitative the results become.

To set up standards whereby parts may be measured very accurately for metallurgical characteristics requires that the equipment be adjustable to select that frequency and measure that electrical characteristic which has the closest correlation to that metallurgical characteristic being determined.

The prior art, including the applicant's U.S. Pat. 3,464,002 issued Aug. 26, 1969, and his application Ser. No. 670,868, filed Sept. 27, 1967, now U.S. Pat. No. 3,478,263, discloses apparatus and means by which the eddy current characteristics of material under test are determined by comparison with a known test specimen by measuring the difference in magnitude of an output signal from two eddy current devices. This prior art discloses the means of making tests throughout a range of frequencies to determine the magnitude and phase angle of the output of the eddy current devices.

None of the devices in the prior art, however, uses a system whereby the resistive component of the output circuit is measured through a range of frequencies and the most sensitive frequency selected and used for the determination of metallurgical deviations.

SUMMARY OF THE INVENTION

It has been discovered that there is good correlation between this resistive component at a particular frequency and the metallurgical characteristics of certain materials. By the present invention use has been made of this resistive component at a particular frequency where maximum correlation occurs between electrical output and metallurgical characteristic to measure the metallurgical characteristic of a material. It has been found that to further improve sensitivity of the instrument a bias signal may be used, the meter circuit and its scale of readings adjusted so that variation in DC output between specimens will represent the full scale of the meter.

According to a preferred form of the present invention, a signal generator having a substantially constant output current but having its frequency variable over a wide range is used as a power source. An eddy current device is connected to this power source in which the primary coil either has a very low Q value or has a resistance or other current control device coupled therein so that the current through this primary coil is substantially constant throughout the range of frequencies used. The effective Q value of the circuit must be no more than 0.1 for the test frequency range.

The test sample is then placed in the eddy current field of this primary and it affects the input to a secondary sensing coil. The latter is coupled to an integrator circuit.

This integration circuit compensates for the normal increase in voltage magnitude from the secondary due to increased energy transfer as the frequency is increased. It also shifts the phase of this signal voltage 90°. With no sample in the eddy current device the increase in voltage output from the secondary coil is compensated by the integrator circuit so that the output from the integrator circuit is constant from a few hertz to several hundred thousand hertz.

A zero-crossing detector is connected in the primary circuit to produce a pulse every cycle as the primary voltage crosses zero going from positive to negative polarity. This pulse together with the output from the integrator circuit is fed into a sampling detector circuit the output of which is proportional to the instantaneous voltage of the signal at the time the detector is triggered by the pulse from zero-crossing detector. This represents the resistive component of the signal at that frequency. This resistive component is zero when no sample is in the holder and the reactive component is constant throughout the range of frequencies.

The signal magnitude at the instant the pulse is received is detected and a DC signal proportional to this instantaneous voltage is produced and fed to a meter to thus indicate the resistive component of the signal at the instant in question. This signal amplitude is the resistive component since the reactive component at this instant is zero.

The operator takes meter readings throughout a range of frequencies and selects the frequency at which the DC meter reading is highest. This reading is a quantitative indication of the resistance component of the signal. The resistance component has the most sensitive correlation at this frequency to the metallurgical characteristics of the part under test. It may therefore be readily used to determine if the part under test is within the specified metallurgical tolerances.

Since the variation in these tolerances allowed may be low, maximum measuring sensitivity is desired and may be maximized by introducing a biasing DC voltage in the meter circuit so as to use the full scale of the meter.

BRIEF DESCRIPTION OF THE DRAWING

FIG. 7 is a chart showing the various voltages and phase angles of the impedance plane produced when the sample is in the eddy current device; and FIG. 8 is a chart showing behavior of the resistive component throughout the wide frequency range for this sample and the behavior of a sample having different metallurgical characteristics.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
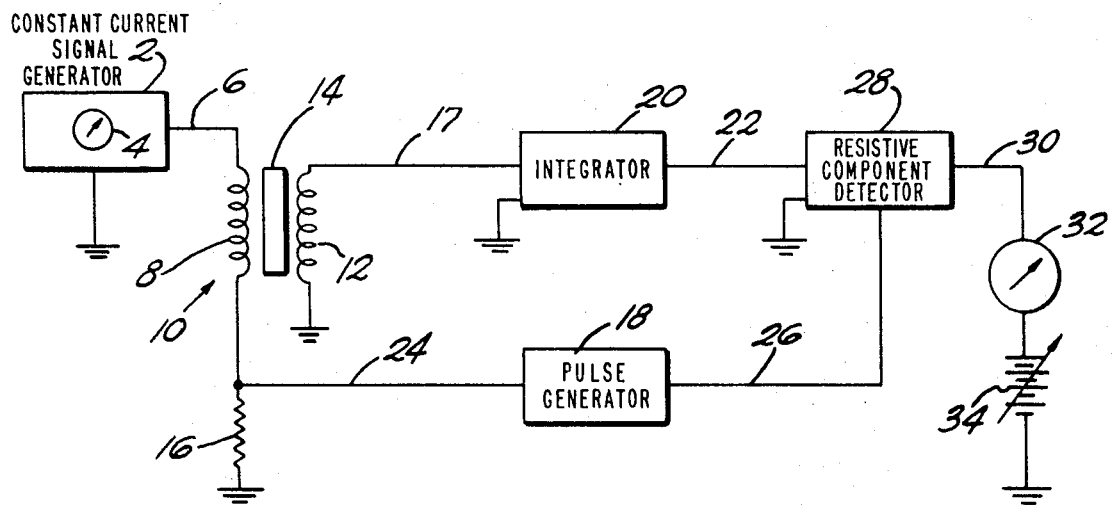
FIG. 1 is a block diagram illustrating one embodiment of the invention.
Figure 2:
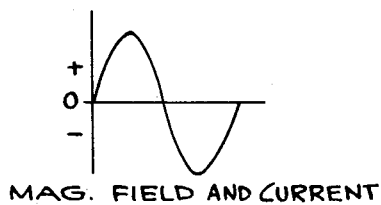
FIG 2 shows the signal generated by the constant current signal source in FIG. 1.

Referring now more particularly to FIG. 1, reference number 2 identifies a substantially constant-current variable frequency signal source whose frequency may be adjusted by the knob 4 and whose current output at 6 is the signal shown in FIG. 2. This signal may be either a sine wave as shown in FIG. 2 or other repetitive wave form, for example, a triangular-shaped wave. This output at 6 is fed through the primary 8 of the eddy current transducer 10 which has a secondary 12 and provision for inserting a sample 14 in the eddy current field of a primary coil 8 to effect the signals used by the secondary coil 12. The signal 6 is also fed through the resistor 16 to produce an input voltage to the zero-crossing pulse generator 18, and this voltage is in phase with the output current of the signal source 2. The output circuit of the signal source 2 which includes the primary coil 8, the resistant 16, and the internal circuit of the source has a combined very low Q value (less than 0.1) so that the current remains substantially constant throughout the frequency range from zero to 9 kilohertz. If the primary coil 8 is copper or the wire is large so that its internal electrical resistance is low, additional resistance is placed in the circuit to maintain an overall circuit Q value at 0.1 or less. As disclosed in U.S. Pat. No. 3,464,002 the secondary coil should also have a Q value of 0.1 or less for the range of test frequencies.

Figure 5:
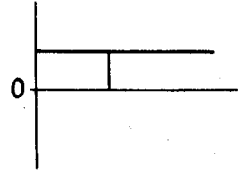
FIG. 5 is the negative pulse-shaped signal produced by the zero-crossing pulse generator.
Figure 3:
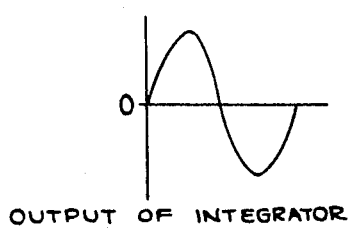
FIG. 3 shows the voltage signal generated at the output of the integrator without a sample in the eddy current device, and this signal is in phase with the current signal shown in FIG. 2.
Figure 6:
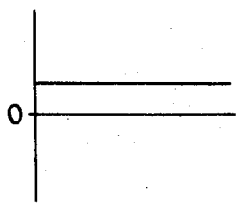
FIG. 6 shows the DC voltage proportional to the height of the signal on the output of the integrator when the primary signal crosses zero going from positive to negative and is fed to the meter under the conditions indicated in FIGS. 4 and 5.
Figure 4:
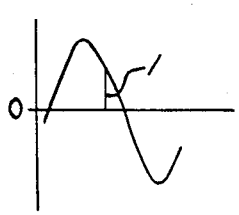
FIG. 4 is the signal at the output of the integrator with a sample having a resistive component in the eddy current device, and it is out of phase with the signal shown in FIG. 2 because of the introduction of a resistive component.

The eddy current device 10 has a provision for placing the sample 14 to be tested in the magnetic field of a primary coil 8, and the sample affects the signal sensed by the secondary 12 in such a way as to affect the magnitude and the phase of the signal produced in the coil 12 of the eddy current transducer 10. If no sample is coupled to these coils the output of the secondary 12 would increase in amplitude with increasing frequency. Connected to the output line 17 of the secondary coil 12 is an integrator 20 whose function it is to compensate for any increase in voltage amplitude which would result from frequency increase. The integrator also shifts the phase of the signal out of the secondary coil by 90° so that it is in phase with that of the primary coil as shown in FIGS. 2 and 3. Therefore, with no sample in the eddy current transducer 10 the output voltage 22 would remain constant in amplitude and phase throughout the full frequency range of the circuit. As mentioned earlier, the voltage across the resistance 16 is in phase with the current produced in the line 6 by the current signal source 2, and this signal is fed through line 24 into a zero-crossing pulse generator 18. This zero-crossing pulse generator 18 is a well-known type, an example of which is shown in the lower portion of FIG. 2 of the applicant's copending application Ser. No. 670,868, filed Sept. 27, 1967. It is a standard-type pulse generator which generates a narrow negative pulse at the instant a sine wave (or other repetitive wave) fed therein through line 24 crosses zero while decreasing in amplitude. No pulse is produced as the output wave crosses zero going from negative to positive. There is but one pulse produced per complete cycle. This pulse is fed through line 26 to the resistance component detector 28. This resistance component detector 28 is a conventional type of sample and hold detector, an example of which is shown in the upper portion of FIG. 2 of the applicant's copending application Ser. No. 670,868, filed Sept. 27, 1967. This pulse is shown in FIG. 5 and is a trigger pulse which is fed into the resistance component detector 28 to pick up the instantaneous amplitude of the voltage signal being fed into resistance component detector 28 when the phase lag is introduced by the sample. This signal produces a DC signal which is proportional to the instantaneous amplitude of the signal being fed into resistance component detector 28 when the pulse from pulse generator 18 arrives. The DC signal thus produced by the resistive component of the input signal is fed from the resistance component detector 28 through the line 30 to a DC meter 32 for indicating the resistive component of the signal being fed into resistance component indicator 28.

This meter has a variable voltage source 34 connected in series therewith so that a DC bias may be introduced below the meter to just under the voltage range to be measured. For example, if the voltage range to be measured is from 40 to 45 volts, the range on the meter may be turned to a 5-volt range and the variable bias adjusted to 40 volts.

The DC voltage produced at the output of resistance component detector 28 is proportional to the resistive component of the signal output of the integrator 20 following the secondary coil 12 of the eddy current transducer 10. It is therefore a measurement of the resistive electrical characteristic of the sample 14. There being a correlation between this electrical characteristic and the metallurgical characteristic of the sample, this meter reading is a reliable indication of the metallurgical characteristic of the sample.

Referring to FIG. 7, a typical set of curves is shown of the electrical signal appearing in the line 22 for a particular sample which we will refer to as sample A. $A_s$ is a curve showing the magnitude of the total signal between 10 hertz and 9 kilohertz. $A_x$ is a curve showing the reactive component of this signal. $A_r$ is a curve showing the resistive component of this signal, and $A_a$ is a phase angle of the signal, all taken throughout the same frequency range.

It will be noted from these curves that a resistive component $A_r$ is a maximum ($A_{rmax}$) at 110 hertz, and therefore for maximum sensitivity the testing of samples of the size and shape of sample 1 should be performed at this frequency of 110 hertz.

In FIG. 8 the resistance component curves are shown for two dissimilar test specimens for the range of frequency from 10 hertz to 9 kilohertz. $A_r$ is the same curve shown as $A_r$ in FIG. 7 with an optimum frequency for test purposes of 110 hertz. A second specimen of a different size, shape, or material has a resistance component curve labeled as $B_r$ and it is here noted that the maximum resistance and hence the frequency at which comparison should be made for samples of this type is 21 hertz.

Formerly it was common practice to test the eddy current characteristics and hence obtain metallurgical characteristics at specified frequencies obtained from a handbook or otherwise. This led to considerable inaccuracy since the most important eddy current characteristic to be compared in checking alloy composition or other metallurgical characteristics is the resistance component comparison at that frequency where the resistance component is maximum for the set of conditions dictated by the particular material, size and shape of the sample under investigation.

In the present invention the electrical characteristic (resistive component) that has greatest sensitivity to the metallurgical characteristics is actually measured for a particular part and set of conditions and then that frequency used for test purposes.

Formerly test frequencies obtained from a generalized set of conditions and published in a handbook were used. This handbook frequency is in very few cases the very best frequency at which to check the metallurgical characteristics of a particular part.

In the operation of the preferred embodiment of the invention, a sample 14 having the desired metallurgical characteristics is placed in a holder so that it forms part of the eddy current circuit between the primary 18 and the secondary 12 of the eddy current transducer 10. The operator then turns on the equipment setting the constant-current signal source 2 at the lower end of the frequency range here shown as 10 hertz. The signal is transferred from the primary to the secondary in a relationship determined by electrical and hence metallurgical characteristics of the sample 14. This signal is then transmitted from the secondary 12 through the line 17 to the integrator 20. The integrator 20 compensates for the increase in energy transfer phase shift between the primary and secondary due to frequency increase and a phase shift of 90° introduced so that the only factor affecting the magnitude and phase of the signal in the line 22 is the eddy current characteristics of the sample. The signal at this point is so compensated as to have the inductive component of the applied field and no resistive component when the eddy current device is empty and the signal magnitude is constant throughout the frequency range. The signal at this point with a sample in the eddy device circuit has both an inductive component and a resistance component. The resistance component is the magnitude of the signal in the line 22 when the signal in the line 6 is at zero.

Therefore, to measure this signal, part of the signal in line 6 is picked off across the resistor 16 and fed by line 24 into the zero-crossing pulse generator 18 which causes a negative pulse to be generated in the line 26 at the instant the signal entering the pulse generator crosses the zero line while going from positive to negative. This pulse is fed to the resistance component detector 28 and senses the resistive component of the signal at that instant of the pulse introduction so that a DC output is produced in 28 which is proportional to the magnitude of the signal in 28 at the instant the negative pulse is introduced. The magnitude of this DC output is indicated by the meter 32. This operation is completed at as many frequencies as are necessary to cover the spectrum under test here shown as from 10 hertz to 9 kilohertz. From a plot of these voltages such as is shown as $A_r$ in FIG. 7 the frequency at which a maximum resistance component is present is determined, in this case as 110 hertz. In this particular case the voltage at this frequency is approximately 28 volts.

The sample is then removed and a variable voltage bias is placed on the meter of about 25 volts and the meter sensitivity changed to have a full range scale of 5 volts (or whatever voltage range acceptable specimens will fall in). From this point on the operator places unknown samples in the holder and readings are taken on meter 32.

The variation in metallurgical characteristics will be indicated by meter readings and previous metallurgical tests will have determined what meter-reading variations are acceptable for the part.

Referring to FIG. 1, source 2 is a standard constant-current signal source, 10 is a holder which is designed for the particular size and shape of the part to be tested. 20 is a standard integrator circuit, an example of which is shown in FIG. 1 of the applicant's U.S. Pat. No. 3,464,002, issued Aug. 26, 1969. 28 is a sample and hold detector of a type well known in the art and here used as a resistive component detector. 18 is a pulse generator of the type well-known in the art. Any DC meter 32 with the desired characteristics may be used.

The invention described in this application is not in the elements but in their particular arrangement and operation to determine that point in the frequency range at which the eddy current characteristics are most indicative of the metallurgical characteristics of the sample under test and in the use of this equipment at that predetermined frequency to check particular size and shape samples to determine if their eddy current characteristics indicate their metallurgical characteristics as being within an acceptable quality range. It will thus be seen that by means of the present invention it is possible to select a proper frequency and to use the equipment herein described at that frequency to determine metallurgical characteristics of the various materials and to determine if certain metallurgical characteristics of the part meet specifications.

It will also be understood that the method and apparatus for determining these eddy current characteristics and the use of them for comparison purposes at particular frequencies are disclosed and described for explanation and illustrative purposes only and are not intended to indicate limits of the invention, the scope of which is defined by the following claims.

I claim:

1. In an eddy current testing apparatus for determining a metallurgical characteristic of material samples; the combination including a substantially constant current, electrical signal source, a single eddy current device having a single primary constant field-producing coil and a single secondary sensing coil with provision for placing the sample in said single device so as to generate an eddy current field between said primary and secondary coils, an electrical narrow pulse signal generator connected to said signal source across a resistor in series with said single primary coil and capable of producing independent of frequency an electrical pulse signal when the electrical current signal from said signal source and the field from said primary coil passes through zero between cycles, an electrical integrator circuit coupled to said secondary coil capable of shifting said signal phase angle by 90° and compensating for variation in the signal voltage amplitude generated across said secondary coil due to electrical signal frequency changes, the signal from said integration circuit is thereby a signal the magnitude and phase angle of which is dependent only upon the eddy current characteristics of said test specimen, a signal detection circuit coupled to said integration circuit and said pulse signal generator circuit, said detection circuit capable of producing a direct current signal proportional to the magnitude of the signal from the integrating circuit at the instant the pulse signal representing the zero crossing of the current through said primary coil and through the zero crossing of the produced field is received from said pulse signal producing circuit, and means for measuring the direct current so produced coupled to said detection circuit, said last mentioned means thereby indicating the magnitude of said resistance component so produced whereby the metallurgical characteristics of the test sample is indicated.

2. In an eddy current testing apparatus as claimed in claim 1 in which the constant current, electrical signal source comprises a signal generator and a constant current circuit.

3. The eddy current testing apparatus as claimed in claim 1, which includes a variable direct current voltage source, and in which the means for measuring the direct current signal voltage is made more sensitive by introducing a biasing voltage by said voltage source into the measuring circuit and the range of said means for measuring the direct current signal voltage is thereby reduced to the range necessary to cover the variations between samples under test.

4. In an eddy current testing apparatus as claimed in claim 1 in which the primary coil of the eddy current coupling device is made from a wire having high electrical resistance and thus reduce the Q value of the circuit.

5. In an eddy current testing device as claimed in claim 1 in which the resistor connected in series with said primary coil has resistance of sufficient magnitude to reduce the Q value of the circuit including said resistor to a value of less than 0.1.

6. In an eddy current testing device as claimed in claim 1 in which said electrical signal source is variable so that the signal therefrom may be varied through a wide range of frequencies.

7. In an eddy current testing apparatus as claimed in claim 1 in which said electrical signal source is variable so that the frequency therefrom may be varied through a range in which the ratio of the maximum frequency to the minimum frequency is at least 100.

8. In an eddy current testing apparatus as claimed in claim 1 in which said electrical signal source is variable so that the frequency therefrom may be varied from a minimum of 10 hertz to a maximum of 100 kilohertz.

9. In an eddy current testing device as claimed in claim 1 in which the electrical signal generated by the constant-current signal source is sinusoidal in shape.

10. In an eddy current testing device as claimed in claim 1 in which the electrical signal generated by the constant-current signal source is triangular in shape.

11. A method of comparing a metallurgical characteristic of unknown material sample to that of a standard sample, comprising placing the standard sample in the field of a coupling device, subjecting the coupling device to uniform current electrical signals over a wide range of signal frequencies, measuring the resistance component of the output signal at various predetermined frequencies, selecting that frequency at which the resistance component of the signal is maximum, and comparing the magnitude of the resistance voltage component of the standard sample under test at that frequency with the resistance voltage component of the unknown sample of same size and shape at the same selected frequency to thereby determine the variation of the eddy current characteristic of the unknown material under test from the eddy current characteristic of the standard sample at the same frequency whereby the metallurgical variation between the standard sample and the unknown material sample is determined.

* * * * *